(12) United States Patent
Cheon et al.

(10) Patent No.: US 10,712,991 B2
(45) Date of Patent: Jul. 14, 2020

(54) CONTENT DISPLAY USING MULTIPLE DISPLAY DEVICES

(71) Applicant: Samsung Electronics Co., Ltd., Gyeonggi-do (KR)

(72) Inventors: Ka Won Cheon, Seoul (KR); Do Hyoung Kim, Seoul (KR); Seong Hoon Kang, Gyeonggi-do (KR); Mi Ra Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 8 days.

(21) Appl. No.: 16/067,455

(22) PCT Filed: Jan. 4, 2017

(86) PCT No.: PCT/KR2017/000111
§ 371 (c)(1),
(2) Date: Jun. 29, 2018

(87) PCT Pub. No.: WO2017/119722
PCT Pub. Date: Jul. 13, 2017

(65) Prior Publication Data
US 2019/0018637 A1        Jan. 17, 2019

(30) Foreign Application Priority Data

Jan. 4, 2016    (KR) .................. 10-2016-0000582

(51) Int. Cl.
*G06F 3/14* (2006.01)
*H04W 4/00* (2018.01)
*G09G 5/14* (2006.01)

(52) U.S. Cl.
CPC .............. *G06F 3/1446* (2013.01); *G06F 3/14* (2013.01); *G09G 5/14* (2013.01); *H04W 4/00* (2013.01);
(Continued)

(58) Field of Classification Search
CPC ............... G09G 5/14; G09G 2330/021; G09G 2330/00; G09G 2340/0442;
(Continued)

(56) References Cited

U.S. PATENT DOCUMENTS

| 7,564,425 | B2 | 7/2009 | Martinez et al. |
| 8,253,649 | B2 * | 8/2012 | Imai ........................ G06F 3/011 345/1.3 |

(Continued)

FOREIGN PATENT DOCUMENTS

| KR | 1020100133778 | 12/2010 |
| KR | 1020140031550 | 3/2014 |
| KR | 1020150019841 | 2/2015 |

OTHER PUBLICATIONS

PCT/ISA/210 Search Report issued on PCT/KR2017/000111 (pp. 3).
(Continued)

*Primary Examiner* — Christopher E Leiby
(74) *Attorney, Agent, or Firm* — The Farrell Law Firm, P.C.

(57) ABSTRACT

A display device is disclosed. The display device may comprise: a memory for storing a content; a display panel for outputting at least a part of the content; multiple contact points arranged on a side surface of the display device; and a control circuit electrically connected to the memory, the display panel, and the multiple contact points.

14 Claims, 17 Drawing Sheets

(52) U.S. Cl.
CPC ... *G09G 2300/026* (2013.01); *G09G 2330/00* (2013.01); *G09G 2330/021* (2013.01); *G09G 2340/0442* (2013.01); *G09G 2340/0492* (2013.01); *G09G 2356/00* (2013.01); *G09G 2370/16* (2013.01)

(58) Field of Classification Search
CPC ....... G09G 2340/0492; G09G 2356/00; G09G 2370/16; G09G 2300/026; G06F 3/1446; G06F 3/14; H04W 4/00
See application file for complete search history.

(56) References Cited

U.S. PATENT DOCUMENTS

| | | | | |
|---|---|---|---|---|
| 8,823,640 | B1* | 9/2014 | Harris | G06F 3/1438 |
| | | | | 345/156 |
| 9,009,984 | B2* | 4/2015 | Caskey | G06F 1/1616 |
| | | | | 33/303 |
| 9,013,416 | B2 | 4/2015 | Huang et al. | |
| 9,052,760 | B2 | 6/2015 | Locker et al. | |
| 9,240,145 | B2 | 1/2016 | Ichioka et al. | |
| 9,367,224 | B2 | 6/2016 | Ananthakrishnan et al. | |
| 9,460,689 | B2 | 10/2016 | Lee et al. | |
| 9,535,648 | B2 | 1/2017 | Kang | |
| 2002/0019654 | A1* | 2/2002 | Ellis | A61F 7/007 |
| | | | | 607/98 |
| 2003/0189529 | A1 | 10/2003 | Martinez et al. | |
| 2005/0168399 | A1* | 8/2005 | Palmquist | G06F 1/1601 |
| | | | | 345/1.1 |
| 2007/0000849 | A1 | 1/2007 | Lutz et al. | |
| 2012/0062475 | A1 | 3/2012 | Locker et al. | |
| 2012/0206319 | A1* | 8/2012 | Lucero | H04N 21/4788 |
| | | | | 345/1.3 |
| 2012/0218191 | A1 | 8/2012 | Huang et al. | |
| 2012/0278727 | A1 | 11/2012 | Ananthakrishnan et al. | |
| 2013/0169510 | A1 | 7/2013 | Tahara et al. | |
| 2014/0043380 | A1 | 2/2014 | Ichioka et al. | |
| 2014/0068469 | A1 | 3/2014 | Lee | |
| 2014/0123038 | A1* | 5/2014 | Ahn | G06F 3/0488 |
| | | | | 715/761 |
| 2014/0368409 | A1 | 12/2014 | Kang | |
| 2015/0379964 | A1* | 12/2015 | Lee | G09G 5/12 |
| | | | | 345/173 |
| 2018/0197508 | A1* | 7/2018 | Chae | G09G 5/391 |

OTHER PUBLICATIONS

PCT/ISA/237 Written Opinion issued on PCT/KR2017/000111 (pp. 6).

European Search Report dated Jul. 18, 2018 issued in counterpart application No. 17736095.5-1210, 17 pages.

* cited by examiner

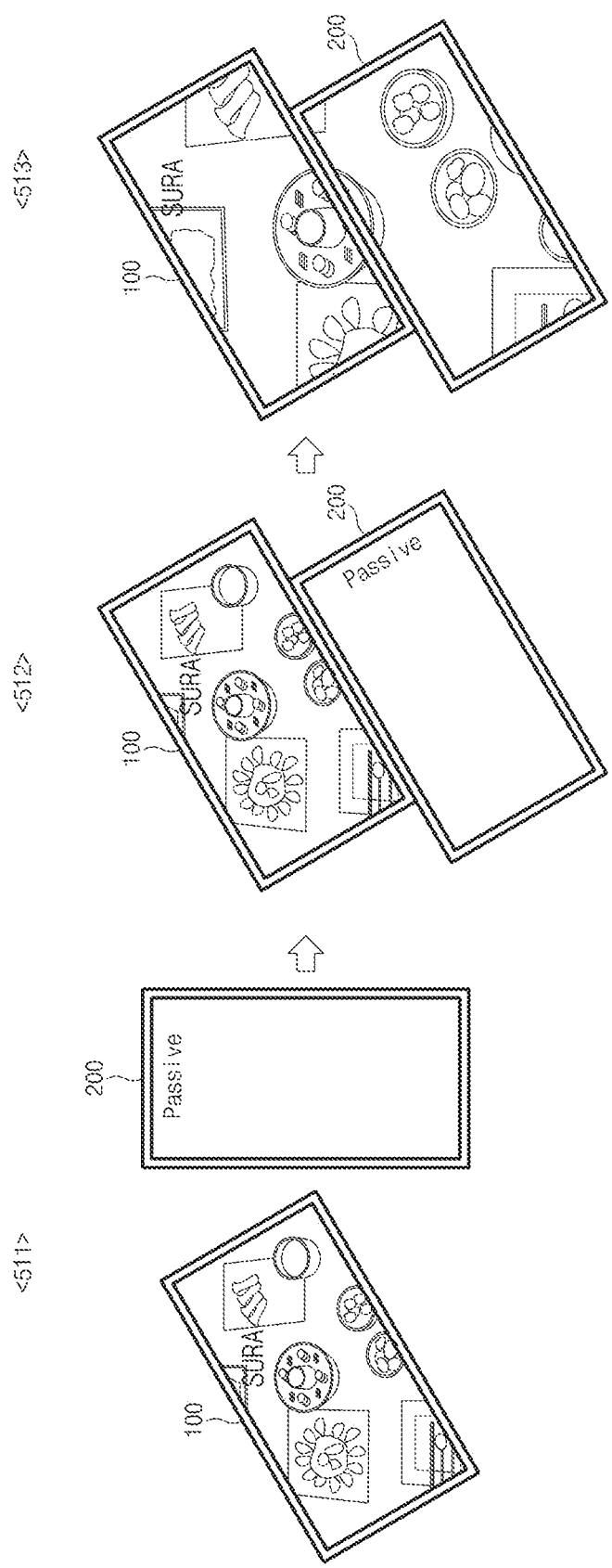

CONTENT DISPLAY USING MULTIPLE DISPLAY DEVICES

PRIORITY

This application is a National Phase Entry of PCT International Application No. PCT/KR2017/000111 which was filed on Jan. 4, 2017, and claims priority to Korean Patent Application No. 10-2016-0000582, which was filed on January 4, 2016, the content of each of which is incorporated herein by reference.

TECHNICAL FIELD

Embodiments disclosed in the present disclosure relate to technologies of displaying content by using a plurality of display devices.

BACKGROUND ART

A conventional scheme of displaying content by using a plurality of displays employs a scheme of individually connecting the displays to a central system and allowing the central system to individually control/manage the displays.

In general, when the change in a physical location or device failure occurs in some of a plurality of display devices and the displays are re-arranged, the central system should manually adjust views outputting contents of the re-arranged displays respectively.

DISCLOSURE

Technical Problem

However, in displaying contents based on a plurality of displays in the above scheme, since there is absent the connection relation between display devices and the relation between displays is not defined, the display devices have to be individually managed in the central system inconveniently.

In addition, since the display devices are individually operated, cables for supplying power may be placed with respect to all display devices. A scheme of outputting content based on the whole layout of the displays has to be manually set.

In addition, the change in the physical attribute such as the phase or the rotation of the display or the change resulting from the separation or the coupling of one of the displays may not be instantly determined and the optimal output scheme may be determined by repeating the layout-test-feedback procedure.

In addition, to add a display device using an additional function, for example, a camera function, an additional system may be constructed or the centrally system has to control the camera function.

Technical Solution

To solve the above-described problems and accomplish objects suggested in the present disclosure, embodiments disclosed in the present disclosure are to intuitively construct a large-scale display structure by implementing a display as a module and linking displays to each other.

In addition, embodiments disclosed in the present disclosure are to couple displays to each other by using bezel regions, to transmit data for managing/controlling a whole display structure constructed through the coupling, and to connect hardware components to each other for data connection and power distribution.

According to an embodiment in the present disclosure, a display device may include a memory to store a content, a display panel to output at least a portion of the content, a plurality of contact points arranged at a side surface of the display device, and a control circuit electrically connected with the memory, the display panel, and the plurality of contact points. A first contact point of the plurality of contact points may make contact with a second contact point arranged at a side surface of an external display device. The control circuit may determine a first region of the content, which is to be output to the display panel, based on arrangement of the display device and the external display device, and may output the determined first region of the content to the display panel.

Advantageous Effects

According to embodiments disclosed in the present disclosure, since display devices implemented as modules may be intuitively coupled to or decoupled from each other, a signage structure may be instantly constructed.

In particular, without expert knowledge on installation or operation of a digital signage, the display structures may be easily arranged and content may be optimally displayed.

In addition, the display structures may be utilized for various usages or purposes by coupling display devices having various functions to each other.

Besides, a variety of effects directly or indirectly understood through the present disclosure may be provided.

DESCRIPTION OF DRAWINGS

FIG. 5B illustrates the change in the displaying of content based on the another coupling of the display devices, according to an embodiment;

MODE FOR INVENTION

Figure 1:
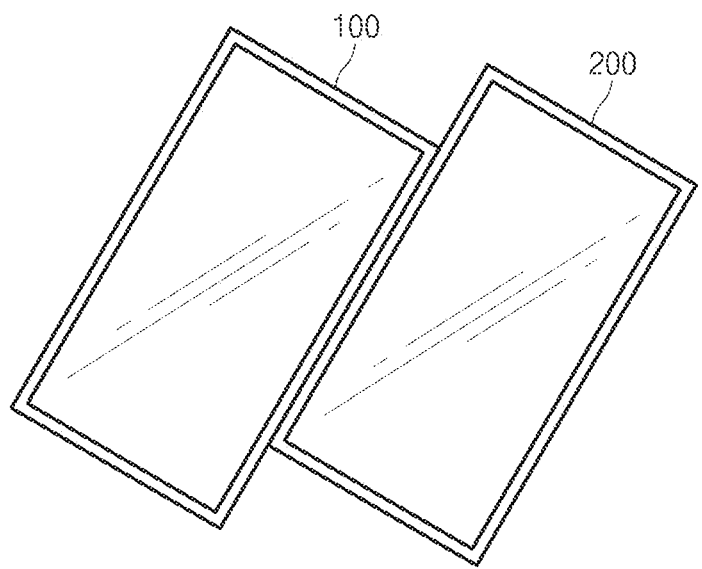
FIG. 1 illustrates display devices, according to an embodiment.

Hereinafter, various embodiments of the present invention will be described with reference to accompanying drawings. However, those of ordinary skill in the art will understand that the present invention is not limited to a specific embodiment, and modifications, equivalents, and/or alternatives on the various embodiments of the present invention are included. In the following description made with respect to the accompanying drawings, similar components will be assigned with similar reference numerals.

In the present disclosure, the expressions "have", "may have", "include" and "comprise", or "may include" and "may comprise" indicate presence of corresponding features (e.g., components such as numeric values, functions, operations, or parts) but do not exclude presence of additional features.

In the present disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms such as "first", "second", and the like used herein may refer to various components regardless of the order and/or priority of the components and may be used to distinguish a component from another component, not to limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when a certain component (e.g., a first component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art disclosed in the present disclosure. It will be further understood that terms used in the present disclosure, which are defined in a dictionary and commonly used, should also be interpreted as being customary in the related art and not in an idealized or overly formal detect unless expressly so defined in the present disclosure. In some cases, even if terms are defined in the present disclosure, they may not be interpreted as excluding embodiments of the present disclosure.

Hereinafter, a display device according to various embodiments will be described with reference to accompanying drawings.

FIG. 1 illustrates display devices, according to an embodiment.

Referring to FIG. 1, a first display device 100 and a second display device 200 may make contact with each other while partially sharing one side surfaces of each other together. The first display device 100 and the second display device 200 may be the same type of display devices. For example, the second display device 200 may be a product completely identical to the first display device 100. In addition, the second display device 200 may be identical to the first display device 100 in one of size or resolution.

In addition, according to an embodiment, the first display device 100 and the second display device 200 may be mutually different types of display devices. For example, the first display device 100 may have a 27-inch size while the second display device 200 may have a 14-inch size. In addition, the first display device 100 may have an aspect ratio of 16:9 (e.g., the ratio of width to height=16:9), and the second display device 200 may have an aspect ratio of 4:3 which is different from that illustrated in the drawing. In addition, the first display device 100 may have resolution corresponding to a first resolution (e.g., 3840×2160; UHD (Ultra High-Definition)/4 k) and the second display device 200 may have resolution corresponding to a second resolution (e.g., 1920×1080; FHD (Full HD)/2 k). In addition, both the first display device 100 and the second display device 200 may include a processing circuit or a control circuit (e.g., a processor such as a CPU, an application processor (AP), or the like) to perform an arithmetic operation. Further, only the first display device 100 of the first display device 100 and the second display device 200 includes a processor, and the second display device 200 may not include a processor. In this case, the second display device 200 may include a circuit (e.g., a display driving integrated chip (DDIC)) to receive data to be output to the second display device 200 from the first display device 100 and to output the received data to a display panel.

Although FIG. 1 illustrates that two display devices make contact with each other, three or more display devices may directly or indirectly make contact with each other. For example, although the first display device 100 and the second display device 200 directly make contact with each other while sharing one side surfaces of each other together, a third display device, which is not illustrated, may make contact with only the first display device 100, both the first display device 100 and the second display device 200, or only the second display device 200. When the third display device directly makes contact with only the second display device 200, it may be understood that the third display device is indirectly connected with the first display device 100.

The connection between display devices may be made through a contact point. For example, as one of contact points provided on the side surface of the first display device 100 makes contact with one of contact points provided on the side surface of the second display device 200, the first display device 100 may be connected with the second display device 200. Two or more display devices may be connected with each other by two or more contact points depending on the arrangements of the display devices. Hereinafter, a display device including the above-described contact point will be described with reference to FIG. 2.

Figure 2:
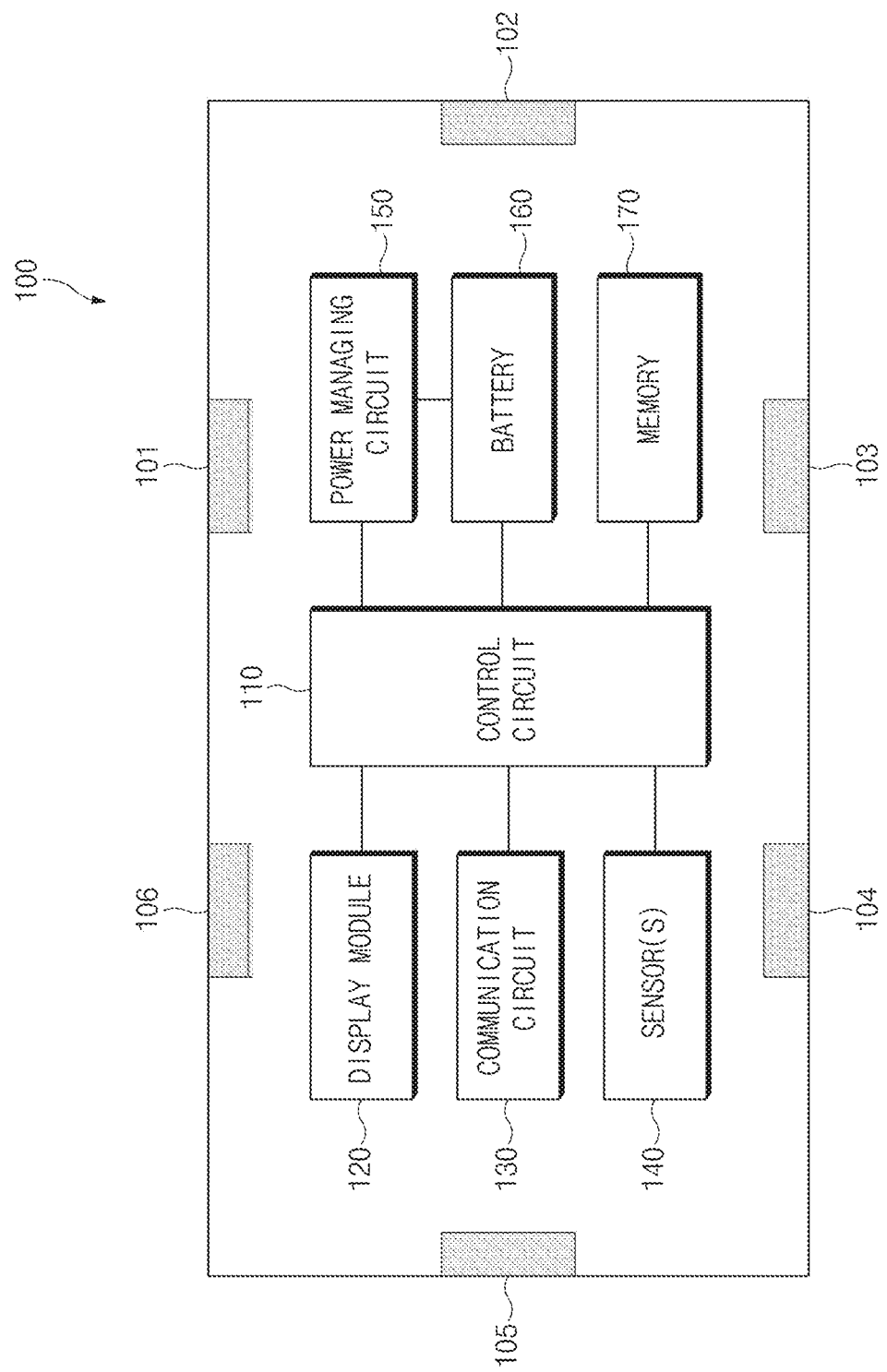
FIG. 2 conceptually illustrates components of a display device, according to an embodiment.

FIG. 2 conceptually illustrates components of a display device, according to an embodiment.

Referring to FIG. 2, the first display device 100 may include a control circuit 110, a display module 120, a communication circuit 130, a sensor (sensors) 140, a power managing circuit 150, a battery 160, and contact points 101, 102, 103, 104, 105, and 106. In the following description, when the first display device 100 needs not to be compared with another display device, the first display device 100 may be simply referred to as a display device 100. In addition, general components which are not illustrated may be included in the display device 100.

The control circuit 110 may include one or more of a central processing unit (CPU), an application processor (AP), or a communication processor (CP). The control circuit 110 may perform, for example, an arithmetic operation or data processing associated with the control and/or the communication of at least one of remaining components of the display device 100. The control circuit 110 may allow contents to be at least partially output onto a display panel of the display device.

For example, the control circuit 110 may control hardware or software components connected to the control circuit 110 by running an operating system or an application program and may perform various data processing and arithmetic operations. The control circuit 110 may be, for example, implemented with a system on chip (SoC). According to an embodiment, the control circuit 110 may further include a graphic processing unit (GPU) and/or an image signal processor. The control circuit 110 may include at least some (e.g., the communication circuit 130) of components illustrated in FIG. 1. The control circuit 110 may load a command or data received from at least one of the remaining components (e.g., a non-volatile memory) into a volatile memory and may process the command or the data. In addition, the control circuit 110 may store various data into the non-volatile memory.

According to an embodiment, the control circuit 110 may perform an operation performed in an analog to digital board (AD board) or a media board. For example, when the display device 100 corresponds to an LCD monitor or an AMOLED monitor, the control circuit 110 may perform an operation of converting an analog signal to a digital signal to specify an RGB value for each pixel.

The display module 120 may include, for example, a liquid crystal display (LCD), a light-emitting diode (LED) display, an organic LED (OLED) display, a transparent display, a mirror display, or an electronic paper display. The display module 120 may display, for example, various contents (e.g., a text, an image, a video, an icon, a symbol, or the like) for a user. The display module 120 may include a touch screen and may receive, for example, a touch, gesture, proximity, or hovering input using an electronic pen or a part of a user's body.

The display module 120 may be understood as a concept including several components for outputting contents to the display device 100. For example, the display module 120 may be conceptually understood as including one or more of a display panel, a DDIC, a polarizing layer, a cover glass, a backlight unit (BLU), and, if necessary, a touch panel. In the present disclosure, outputting a content to a display device, outputting a content to a display panel, and outputting a content to a display module may be understood as being identical concept to each other.

The communication circuit 130 may include a wireless communication module (e.g., an RF module) for transceiving signals in various frequency bands and a wired communication module for making wired communication. The RF module may include, for example, a transceiver, a power amplifier module (PAM), a frequency filter, a low noise amplifier (LNA), an antenna, or the like.

The wireless communication may correspond to, for example, at least one of cellular communication such as a long-term evolution (LTE), LTE-advanced (LTE-A), a code division multiple access (CDMA), a wideband CDMA (WCDMA), a universal mobile telecommunications system (UMTS), a wireless broadband (WiBro), or a global system for mobile communications (GSM). The wireless communication may include short-range radio communication, such as wireless fidelity (Wi-Fi), Bluetooth, near field communication (NFC), magnetic stripe transmission (MST), Bluetooth low energy (BLE), or Wi-Fi Direct.

Antenna radiators to support the wireless communication schemes may be disposed at proper positions of the display device 100. According to an embodiment, at least some of the antenna radiators may be substituted with a metal material constituting a bezel or a side-surface frame of the display device 100. In addition, a plurality of antennas may be arranged to support one wireless communication scheme. For example, the display device 100 may include a diversity antenna. Further, in the display device 100, antennas for supporting the NFC scheme may be disposed at edges (e.g., four corner regions) of the display device 100.

In addition, the wireless communication may include satellite communication such as a Global Positioning System (GPS), a Global Navigation Satellite System (Glonass), Beidou Navigation Satellite System (Beidou) or Galileo (the European global satellite-based navigation system).

The wired communication may include at least one of a universal serial bus (USB) (e.g., USB 3.1(type C)), a high definition multimedia interface (HDMI), an inter integrated circuit (I2C), or a recommended standard 232 (RS-232). A wire structure for the wired communication may be connected with the contact points 101, 102, 103, 104, 105, and 106.

The sensor(s) 140 may include at least one sensor. For example, the sensor 140 may include an acceleration sensor or a gyro sensor to sense the inclination of the display device 100. In addition, the sensor 140 may include a proximity sensor to sense the proximity of a user or another display device (e.g., the proximity to the contact point 101 of the second display device 200). In addition, an illuminance sensor, a microphone, a pressure sensor, a temperature sensor, or the like may be included in the sensor (sensors) 140.

The power managing circuit 150 may manage the power of the display device 100. According to an embodiment, the power managing circuit 150 may include a power management integrated circuit (PMIC), a charger integrated circuit (charger IC), a battery gauge, or a fuel gauge. The PMIC may have a wired charging scheme and/or a wireless charging scheme. The wireless charging scheme may include, for example, a magnetic resonance, magnetic induction, or electromagnetic scheme and may further include an additional circuit, for example, a coil loop, a resonant circuit, a rectifier, or the like, for the wireless charging. The battery gauge may measure, for example, a remaining capacity of the battery 160 and a voltage, a current or a temperature thereof while the battery 160 is charged. The battery 160 may include, for example, a rechargeable battery or a solar battery.

The power managing circuit 150 may perform a control operation to supply power to external display devices connected with the display device 100 through contact points, by taking into consideration the arrangement, the operation, and the environment of the external display devices connected with the display device 100 through the contact points. For example, the power managing circuit 150 may supply a larger amount of power to an external display device having a larger size or higher resolution and may supply a smaller amount of power to an external display device having a smaller size or lower resolution. In addition, the supplying of the power may be determined by taking into consideration the arrangement of displays directly or indirectly connected with the contact points. For example, when five displays are directly/indirectly connected with the contact point 102, and when one display is directly/indirectly connected with the contact point 105, a larger amount of power may be provided to the external display device through the contact point 102.

The memory 170 may include a volatile and/or nonvolatile memory. The memory 170 may store, for example, a command or data associated with at least one of remaining component(s) of the display device 100. According to an embodiment, the memory 170 may store software and/or a program. In addition, the memory 170 may store at least one content, such as an image, a moving picture, or a media file, to be displayed on the display device 100 and display devices directly or indirectly connected with the display device 100.

The memory 170 may correspond to an embedded memory, may be inserted into the display device 100, or may be an external memory connected through a cable. For example, an embedded memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD).

The external memory may correspond to a flash drive, for example, a compact flash (CF), a secure digital (SD), a micro secure digital (Micro-SD), a Mini-SD, an extreme digital (xD), a multimedia card (MMC), a memory stick or the like. The external memory may be operatively and/or physically connected to the display device 100 through various interfaces.

The contact points 101, 102, 103, 104, 105, and 106 may be connected with different contact points provided in an external display device. The number and the arrangement of the contact points 101, 102, 103, 104, 105, and 106 illustrated in FIG. 2 are provided for the illustrative purpose, and the display device 100 or external display devices may have contact points varied in number or arrangement. For example, five contact points may be arranged in a width direction of the display device 100 and two contact points may be arranged in a height direction thereof Two or more display devices may be coupled to each other to be variously arranged depending on the arrangement and the number of the contact points.

Figure 3A:
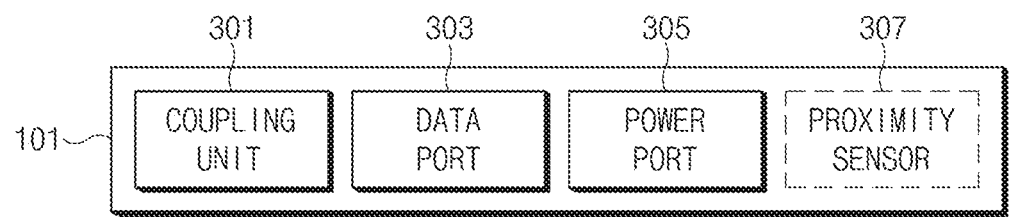
FIG. 3A conceptually illustrates a contact point, according to an embodiment.

FIG. 3A conceptually illustrates a contact point, according to an embodiment.

Referring to FIG. 3A, the contact point 101 may include a coupling unit 301, a data port 303, and a power port 305. In addition, the contact point 101 may selectively include a proximity sensor 307.

All the contact points provided in the display device 100 may have the same structure. In addition, contact points provided in an external display device coupled to the display device 100 may be identical to a contact point of the display device 100 or may have a specification compatible with the contact point of the display device 100.

The coupling unit 301 may be implemented with a structure or a material for maintaining two display devices coupled to each other through the contact point 101 such that the two display devices are not decoupled from each other. For example, the coupling unit 301 may include a coupling magnet having magnetic force sufficient to endure the load of the display device 100 or the external display device (e.g., the second display device 200) or to prevent the display devices from being decoupled from each other. For example, two displays may be coupled to each other by the contact between an N pole of a magnet, which is provided in the coupling unit 301, and an S pole, which is provided in the external display device, through a magnetic force.

In addition, the coupling unit 301 may have a structure for mechanically coupling two displays to each other. For example, the coupling unit 301 may have a buckle structure or an irregular structure. For an example, an embodiment using a magnet will be described with reference to FIG. 3B.

The contact point 101 may include the data port 303. The data port 303 may be connected with a data port of an external display device when the display devices are coupled to each other through the contact point 101. Accordingly, through the data port 303, a data line may be connected for data exchange between the first display device 100 and the second display device 200. The first display device 100 may obtain, through the data port 303, the size of the second display device 200, the display resolution of the second display device 200, a residual amount of a battery of the second display device 200, a connection state with an external power source, or information on another external display device connected with the second display device 200. The first display device 100 may transmit data, which is to be output to the second display device 200, to the second display device 200 through the data port 303. If there is present a display device (e.g., a third display device) indirectly connected with the first display device 100 through the second display device 200, the first display device 100 may transmit data, which is to be output from the third display device, to the second display device 200. In this case, a command for transmitting the data to the third display device may be transmitted together.

The contact point 101 may include the power port 305. The power port 305 may be connected with a power port of an external display device when the display devices are coupled to each other through the contact point 101. Through this, a power supply line may be connected for supplying power between the first display device 100 and the second display device 200.

The contact point 101 may selectively include the proximity sensor 307. According to an embodiment, a first contact point (e.g., the contact point 101) of the first display device 100 may make contact with a second contact point provided on the side surface of an external display device (e.g., the second display device 200). Accordingly, one side surface (e.g., a right side surface) of the first display device 100 having the first contact point may at least partially make contact with one side surface (e.g., a left side surface) of the second display device 200 having the second contact point. However, for example, when a user moves the second display device 200 in the state that side surfaces partially make contact with each other, so as to make a specific display arrangement, the third contact point adjacent to the second contact point may be unstably coupled to the first contact point of the first display device 100. For example, when two magnets are provided at opposite ends of the contact point, the magnets may be coupled to each other in the state that the data port 303 or the power port 305 is not coupled (e.g., the case that the upper magnet of the first contact point is coupled to the lower magnet of the second contact point). In this case, since a data line or a power supply line is not connected, it may be determined, through the proximity sensor, whether the contact points is completely coupled to each other. The control circuit 110 of the display device 100 may divide and output a content based on the arrangement of the first display device 100 and the second display device 200, when sensing, by the proximity sensor, that the first contact point normally makes contact with (coupled with) the second contact point (of the second display device 200), and may output the content only to the first display device 100 when sensing that the first contact point does not make contact with the second contact point or the contact between the first contact point and the second contact point is released.

Figure 3B:
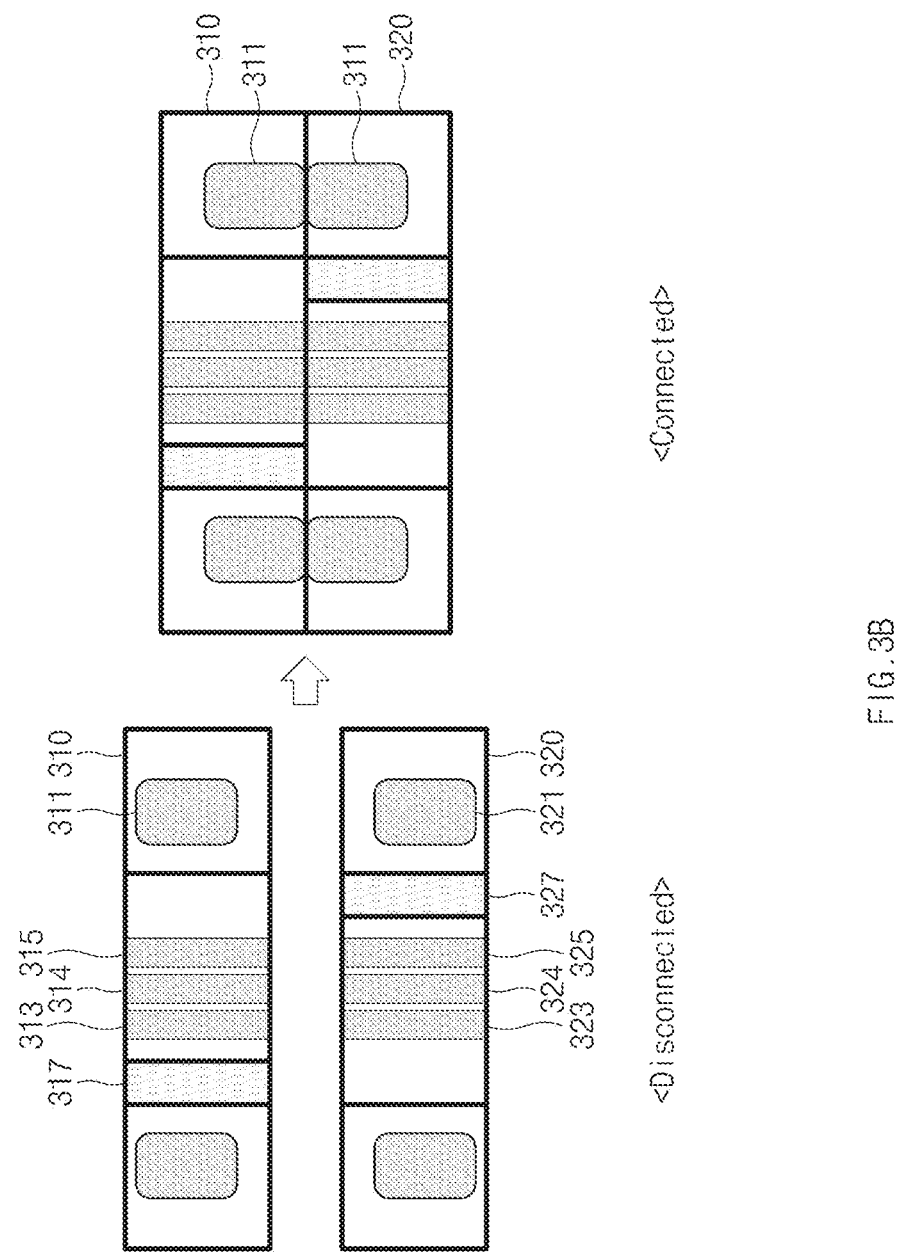
FIG. 3B illustrates a sectional view of a contact point, according to an embodiment.

FIG. 3B is a sectional view illustrating a contact point, according to an embodiment.

A contact point 310 may correspond to, for example, any one (e.g., the first contact point) of the contact points 101, 102, 103, 104, 105, and 106 of the first display device 100. A contact point 320 may correspond to a specific contact point (e.g., the second contact point) of contact points of the second display device 200. The following description will be made while focusing on the contact point 310 and the description of the contact point 320 will be omitted since the contact point 310 and the contact point 320 are the same type of contact points and have structures corresponding to each other.

The state of <disconnected> of FIG. 3B represents that the contact point 310 is decoupled from the contact point 320. In this case, permanent magnets 311 positioned at opposite ends may be positioned in a specific internal space of the contact point 310 due to another magnetic influence or mechanical influence. In addition, a power line 313, a grounding line 314, and a data line 315 may be disposed inside the contact point 310. In addition, one end of each wire structure may be exposed to the outside at a surface of the contact point 310. The coupling with the second point 320 is made through the exposed region in terms of a circuit. According to an embodiment, at least one of the power line 313, the grounding line 314, and the data line 315 may be omitted.

In addition, the contact point 310 may selectively include a proximity sensor 317. The proximity sensor 317 may have an arrangement different from that illustrated in FIG. 3B. For example, the proximity sensor 317 may be arranged at the outside of the permanent magnet 311 or may be arranged at the upper ends or the lower ends of lines.

Similarly to the contact point 310, the contact point 320 may include a permanent magnet 321, a power line 323, a grounding line 324, a data line 325, and a proximity sensor 327.

The state of <connected> of FIG. 3B represents that the contact point 310 is normally coupled to the contact point 320. For example, the state of <connected> may correspond to the state that permanent magnets disposed at opposite ends of the contact point 310 are magnetically strongly connected with permanent magnets disposed at opposite ends of the contact point 320.

According to an embodiment, lines may be provided such that the contact points 310 and 320 are coupled to each other in a specific direction. However, according to another embodiment, the lines are arranged to be connected with each other regardless of a coupling direction. For example, the contact point may having power lines 313, grounding lines 314, and data lines 315 arranged in two rows. (In this case, the contact point 310 may have six lines in total.). In this case, the lines may be arranged in the second row in the inverse sequence of lines arranged in the first row.

The contact points described with reference to FIGS. 3A and 3B are provided for the illustrative purpose, and may have various modifications. For example, the position of a magnet, a port, or a line structure may be changed, omitted, or added. For example, when external displays connected with the display device 100 operate through batteries embedded therein or through the supply of an external AC power, the power supply lines may be omitted.

Figure 4A:
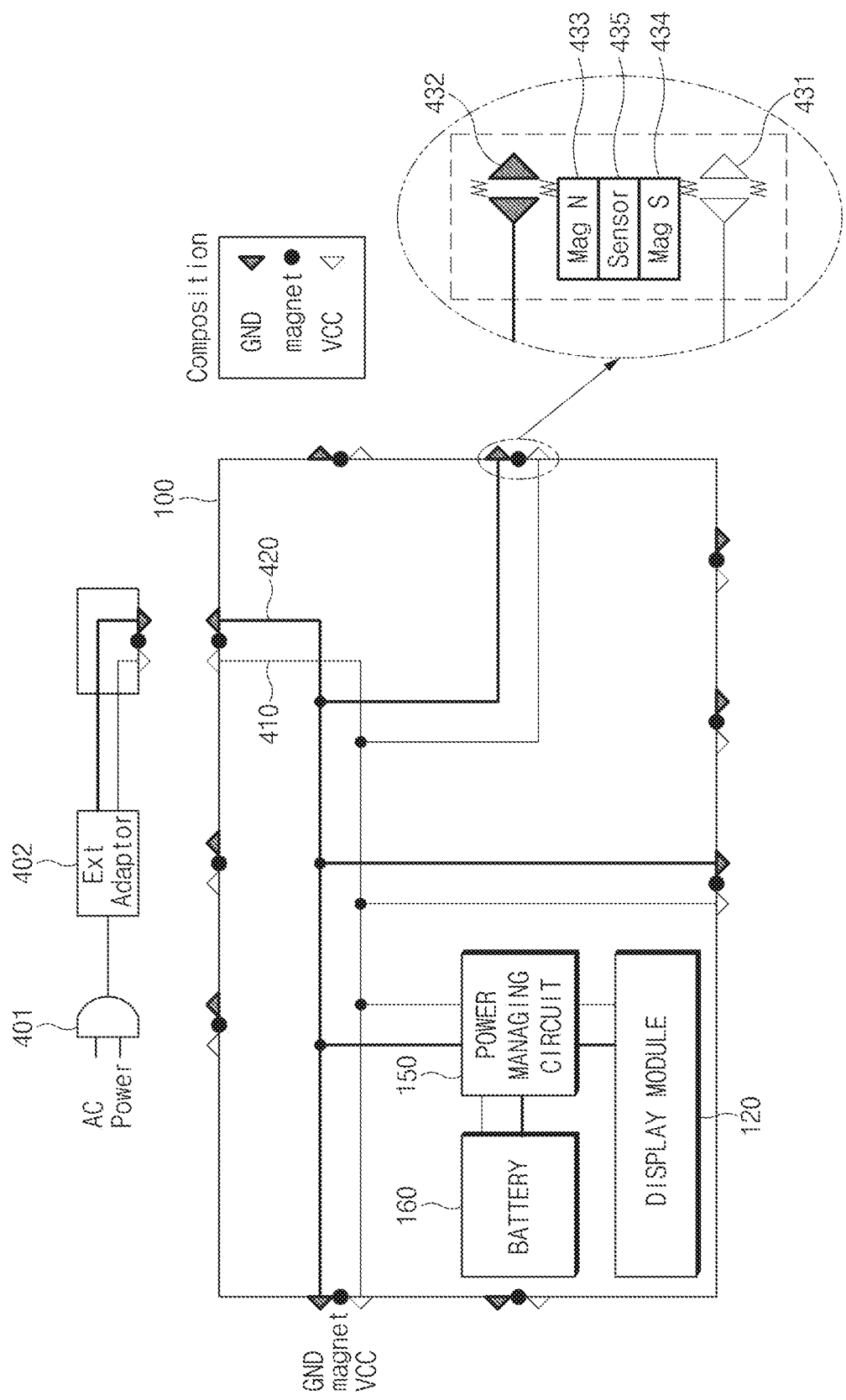
FIG. 4A illustrates a circuit diagram of an internal power source of a display device, according to an embodiment.

FIG. 4A illustrates a circuit diagram of an internal power source of a display device, according to an embodiment.

Referring to FIG. 4A, the display device 100 may have 10 contact points (e.g., three contact points on the upper side surface end, three contact points on the lower side surface, two contact points on the left side surface, or two contact points on the right side surface). The above structure is provided for the illustrative purpose, and the arrangement and the number of contact points may be variously modified. In addition, for the convenience of explanation, only lines associated with the supplying of power are displayed in FIG. 4A and FIGS. 4B and 4C to be described later The display device 100 may be connected with an AC power source 401 through an external adaptor 402. For example, the display device 100 may be connected with the external AC power source 401 through one of contact points positioned at the upper end thereof. However, according to another example, the display device 100 may include an additional power port for connection with the AC power source 401 and may receive power through the power port. For example, when the display device 100 is attached onto a wall surface like a wall TV, the display device 100 may receive power through the power port positioned on the rear surface thereof and power may be supplied to other external displays directly or indirectly connected with the display device 100 through the contact point. In this case, power lines provided to the display devices are not viewed in terms of an outer appearance and thus the esthetic sense may be improved.

The display device 100 may be connected with one external display on the right side surface, the lower side surface, and the left side surface thereof, that is, may be connected with the total three external displays. The power supplied through the AC power source 401 may be used to charge the battery 160 or to supply power necessary for the operations of components, such as the display module 120, of the display device 100 through the power managing circuit 150. In addition, the power supplied through the AC power source 401 may be properly distributed into a display device connected with the right side surface, a display device connected with the lower side surface, and a display device connected with the left side surface, through an electrical path formed in the internal line structure. In addition, according to an embodiment, the power managing circuit 150 or the control circuit 110 may properly distribute a portion of power, which is received from the AC power source 401, or available power (e.g., external power and power of an embedded battery) of the display device 100 to a contact in a connected state, by taking into consideration the number, the resolution, or the power consumption of external display devices directly or indirectly connected with the display device 100. For example, when one external display device is directly connected and three external display devices are indirectly connected, through contact points provided on the right side surface, and only one external display device is directly connected through a contact point provided on the left side surface, the power managing circuit 150 may supply a more amount of power to the right side surface. In other words, the internal power line structure of the display device 100 may have the form selectively or alternatively managed by the power managing circuit 150. At least a portion of the electrical path may be implemented in the form of a bypass.

The contact point illustrated in FIG. 4A may include a power supply terminal (port) (VCC) 431, and a ground terminal GND 432, and a coupling magnet. Although not illustrated, a port (e.g., a data port 303) for data transmission may be additionally included. In addition, when comparing with components in FIG. 3A, a magnet (with N pole) 433 and a magnet (with S pole) 434 may correspond to the coupling unit 301, and the VCC 431 and the GND 432 may correspond to the power port 305, and the sensor 435 may correspond to the proximity sensor 307.

Figure 4B:
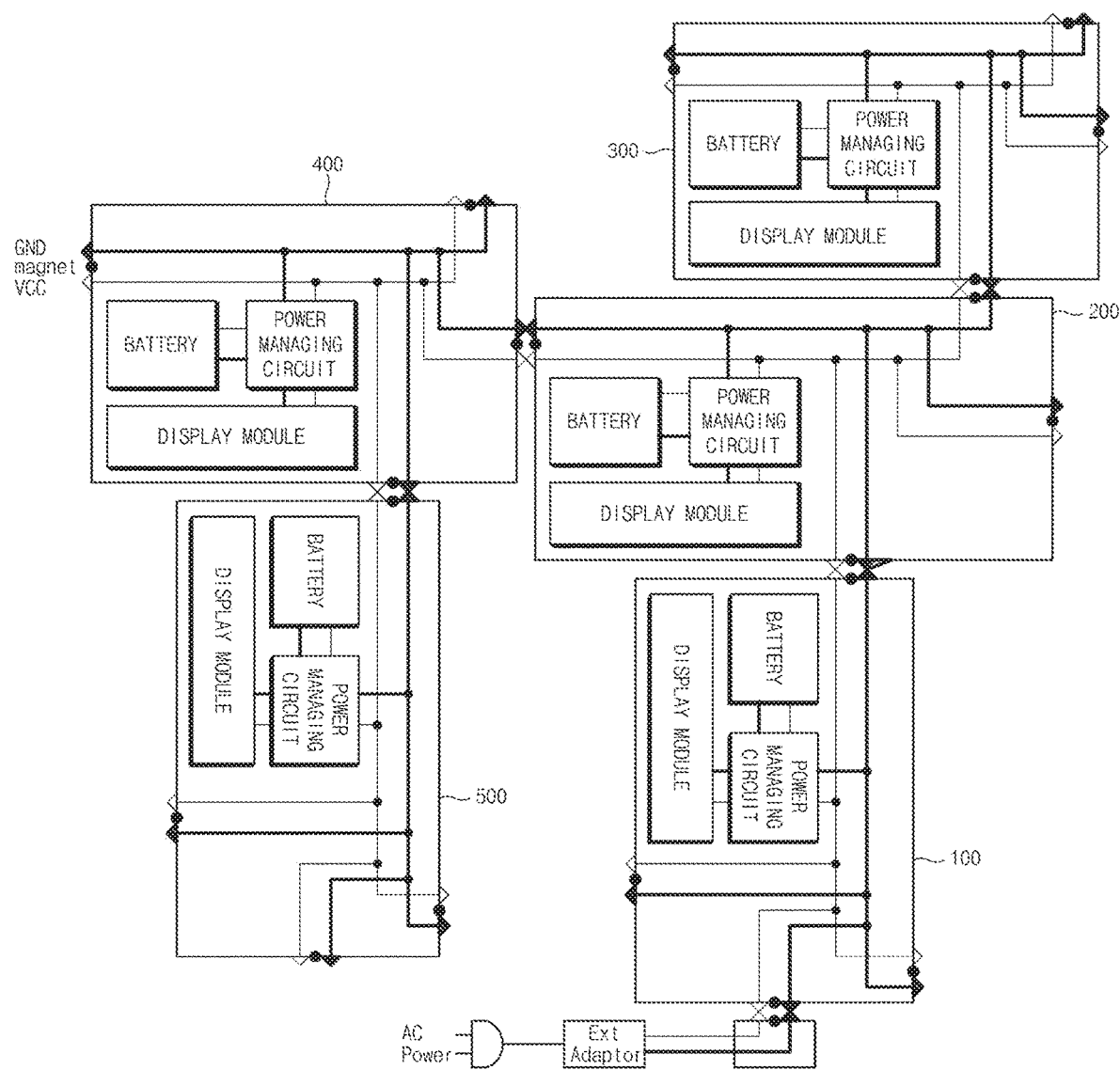
FIG. 4B illustrates an example that display devices are coupled to each other, according to an embodiment.

FIG. 4B illustrates an example that display devices are coupled to each other, according to an embodiment. In FIG. 4B, the second display device 200 is directly coupled to the first display device 100, a third display device 300 and a fourth display device 400 are directly coupled to the second display device 200, and a fifth display device 500 is directly coupled to the fourth display device 400. In this case, the third display device 300, the fourth display device 400, and the fifth display device 500 have the indirect connection relation with the first display device 100. For example, a display device electrically connected with a contact point of the first display device 100 and having one side surface making contact with one side surface of the first display device 100 may be understood as having the direct connection relation with the first display device 100. In addition, a display device only electrically connected with the contact point of the first display device 100 without making contact with each other at a portion of a side surface thereof may be understood as having the indirect connection relation with the first display device 100. For the convenience of explanation, it is assumed that five illustrated display devices are identical to each other.

In the embodiment illustrated in FIG. 4B, the first display device 100 may receive power from an AC power source. The first display device 100 may supply power to the second display device 200 through contact points by taking into consideration power consumption of the second display device 200 and three display devices 300, 400, and 500 indirectly connected with the first display device 100 through the second display device 200. The second display device 200 may supply power, which is twice greater than power supplied to the third display device 300, to the fourth display device 400, by taking into consideration the third display device 300 and the fourth display device 400, which are directly connected with the second display device 200, and the fifth display device 500 indirectly connected with the second display device 200.

Figure 4C:
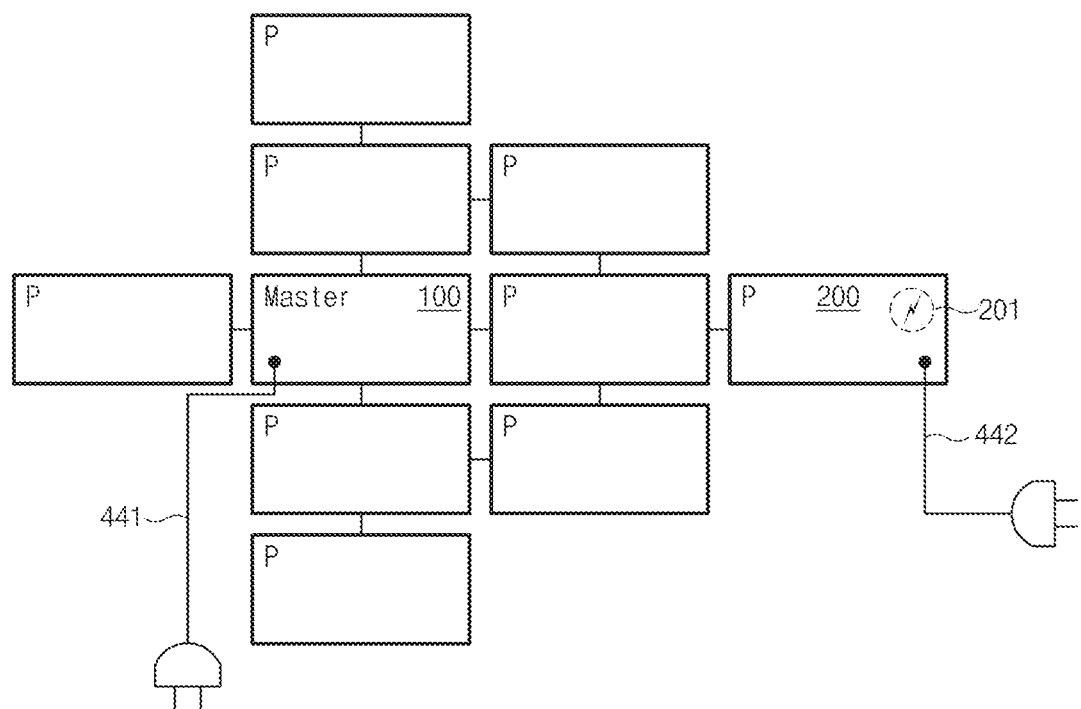
FIG. 4C illustrates another example that display devices are coupled to each other, according to an embodiment.

FIG. 4C illustrates another example that the display devices are coupled to each other, according to an embodiment.

Referring to FIG. 4C, a plurality of external display devices may be directly or indirectly connected with the first display device 100. In the case illustrated in FIG. 4C, nine external display devices may be directly or indirectly connected with the first display device 100.

According to an embodiment, the first display device 100 may serve as a master display. The nine external display devices may serve as passive displays. The distinguishment between the master display and the passive display is made depending on the roles or the functions performed by devices and not originally made depending on the devices. For example, the master display may manage and supply information or contents to be displayed on a display structure constructed by a display group (e.g., the first display device 100 and nine external display devices, or a master display and one or more passive displays). In addition, the master display may detect the states of the display devices, such as the intrinsic inclination of the master display, inclinations of passive displays connected with the master display, or the proximity state of a user, by using various sensors. Further, the master display may navigate or handle contents by recognizing a bezel touch or a user input to a touchscreen. For example, when the user inputs multiple touches (e.g., zoom-in) to the passive display, the master display enlarges the content, which is currently output to the display structure, into the full size of the display structure. In this case, if the passive display enlarges only contents region output to the passive display, the unity may not be made in terms of the full display structure and thus a user experience may be interrupted.

Referring back to FIG. 4C, the first display device 100 may be connected with an external AC power source through a power charging path 441. The first display device 100 may transmit a portion of available power to each passive display directly connected with the first display device 100 through a contact point, based on the arrangement and the connection state of displays. In detail, the control circuit 110 or the power managing circuit 150 may supply power to the passive display device, based on whether the passive display device is connected with an external power source, the resolution of the passive display device, or the power consumption of the passive display device. If the first display device 100 is not connected with the external AC power source, the available power of the first display device 100, the resolution of the first display device 100, or consumption current of the first display device 100 may be taken into consideration when supplying power to the passive display device.

If it is difficult for the first display device 100 to supply a sufficient amount of power to all passive display devices, for example, if it is expected that the first display device 100 supplies power in amount smaller than that of power required by the second display device 200, the first display device 100 may provide, to the second display device 200 (or another passive display device directly/indirectly connected with the second display device 200 and directly connected with the first display device 100), an indication representing that the shortage of power to be supplied to the second display device 200 is expected. In this case, the second display device 200 may output information representing the shortage of power on a display. Accordingly, a user may supply external power to even the second display device 200 through a power supplementing path 442. In addition, as described above, information 201 representing the shortage of power as described above is not directly displayed on the second display device 200 but information representing that the shortage of power is expected in the second display device 200 may be displayed on the first display device 100.

According to an embodiment, the control circuit 110 or the power managing circuit 150 may check a power amount to be supplied through a contact whenever displays are coupled to each other or decoupled from each other.

Figure 5A:
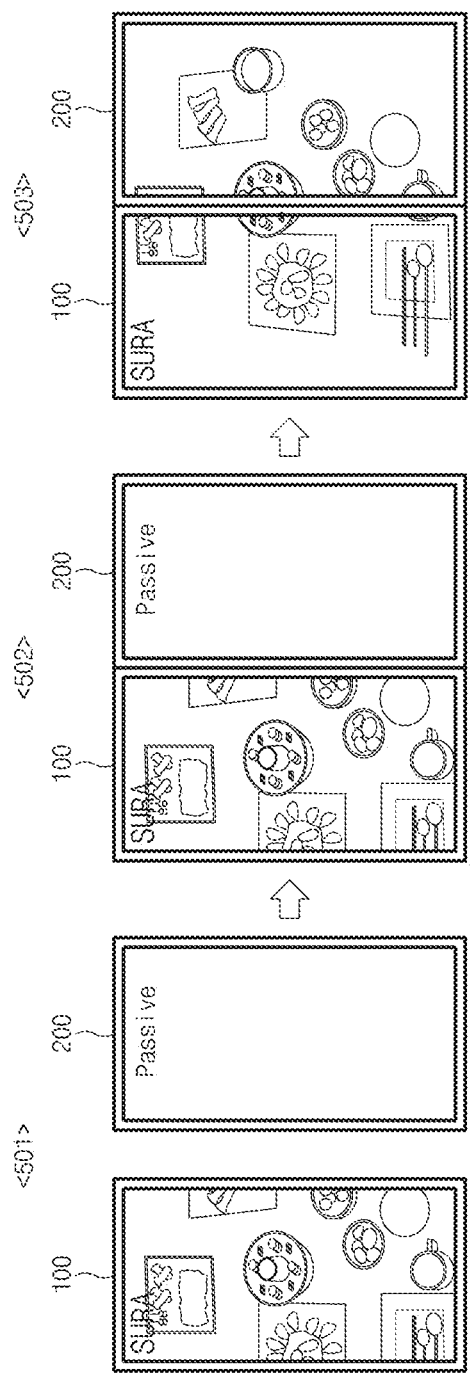
FIG. 5A illustrates the change in the displaying of a content depending on the coupling between the display devices, according to an embodiment.

FIG. 5A illustrates the change in the displaying of a content depending on the coupling between the display devices, according to an embodiment.

Referring to state <501> of FIG. 5A, a content may be output only to the first display device 100 before the first display device 100 is coupled to the second display device 200. In this case, the content may correspond to media data such as an image or a moving picture, a web page, flash data, or the like.

In this case, the first display device 100 may correspond to a master display. The second display device 200 may correspond to a passive display. By taking into consideration the resolution of the content to be output and the resolution of the first display device 100, the first display device 100 may output a proper region of the content to the first display device 100, or may resize the content such that the content is fully viewed onto the first display device 100. For example, the first display device 100 may output the content by matching to the resolution and the height, or the width of the display panel and making alignment (e.g., center alignment, left alignment, or the like), according to a specific criterion, while maintaining the ratio of the content.

As illustrated in state <502>, when the second display device 200 is coupled to the right side of the first display device 100, the first display device 100 may determine relevant regions of the content to be output to the first display device 100 and the second display device 200, based on the arrangement between the first display device 100 and the second display device 200. For example, the control circuit 110 may determine a first region to be output to the first display device 100 and a second region to be output to the second display device 200, may output a region of the content corresponding to the first region to the display panel, and may provide a region of the content corresponding to the second region to the second display device 200 through a contact point. For example, the control circuit 110 may encode media data based on the size and the resolution of the second display device 200 and the second region and may transmit the encoded data to the second display device 200 through the contact point. As a result, as illustrated in state <503>, the content may be fully output to the full display structure constructed by the first display device 100 and the second display device 200.

According to an embodiment, data to be output to the second display device 200 may be transmitted to the second display device 200 without passing through the contact point. For example, when the first display device 100 and the second display device 200 support the same type of a short-range wireless network (e.g., Wi-Fi, Bluetooth, or the like), the first display device 100 may transmit data on the second region to the second display device 200 through the communication circuit 130 in a proper wireless communication scheme.

FIG. 5B illustrates the change in the displaying of a content depending on another coupling between display devices, according to an embodiment.

Referring to FIG. 5B, in state <511>, the first display device 100 may be inclined at a specific degree about a vertical direction (e.g., the direction of gravity). For example, when display devices are attached onto the surface of a wall, each display device may sense the inclination about the direction of the gravity by using a gyro sensor or a gravity sensor. In this case, the first display device 100 may sense the inclination, and may correct and output an angle for outputting a content. For example, the first display device 100 allows a user to always view an image consistently arranged regardless of a device inclination. In other words, even if the first display device 100 is rotated, an image may be viewed on the first display device 100 without being rotted, by correcting the rotation angle.

Now, when the second display device 200 is coupled to one point of the first display device 100 as illustrated in state <512>, the first display device 100 may determine display regions depending on the arrangements of the first display device 100 and the second display device 200 based on the position of a contact coupled to the second display device 200, the size and the resolution of the second display device 200, and a position of a coupled contact of the second display device 200. The control circuit 110 of the first display device 100 may determine a first region to be output to the first display device 100 and a second region to be output to the second display device 200, based on the above determination result. Even if a content is output on a display region including the first display device 100 and the second display device 200, the content may be output consistently (e.g., horizontally to the ground surface or vertically to the direction of gravity) regardless of the inclination of a specific display device (e.g., the master display). However, according to another embodiment, the content, which is rotated based on the inclination or the angle of the display device serving as the master display, may be output to the full display region.

Figure 6A:
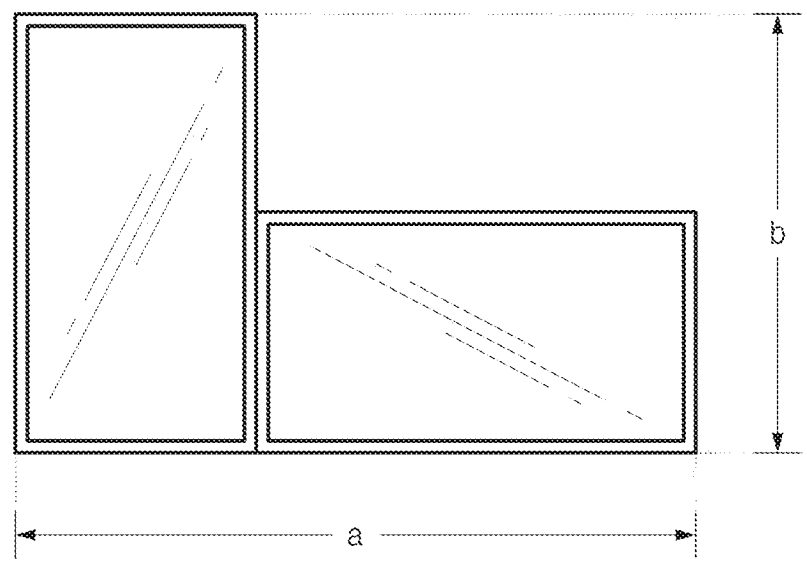
FIG. 6A illustrates a method of determining a region for outputting a content, according to an embodiment.

FIG. 6A illustrates a method of determining a region for outputting a content, according to an embodiment.

FIG. 6A illustrates that two displays are connected with each other through contacts while at least partially sharing one sides surfaces thereof together. For the convenience of explanation, a display device disposed at the left side is assumed as the first display device 100 and a display device disposed at the right side is assumed as the second display device 200. In this case, the first display device 100 may act as a master display and the second display device 200 may act as a passive display. However, even if left/right display devices are switched to each other, the roles of the master/passive displays are switched to each other, or three or more display devices are randomly arranged, any influence may not be exerted on the method of determining a region for outputting output the content to be described with reference to FIG. 6A.

Referring back to FIG. 6A, the first display device 100 may map a content, which is to be output, to a virtual quadrangle region circumscribed about the full display region constructed based on the arrangement of the displays. In FIG. 6A, the width (breadth) of the circumscribed virtual quadrangle region may be "a" and the height (length) of the circumscribed virtual quadrangle region may be "b". The first display device 100 may determine regions of the content mapped to regions, which correspond to display devices, of the virtual quadrangle region as regions to be output to respective displays. For example, a region corresponding to the first display device 100 may be determined as the first region, the region corresponding to the second display device 200 may be determined as the second region, and contents of a region, which does not correspond to any display device, of the virtual quadrangle region may be determined not to be output.

To complement the region, in which the content is not output, and to continuously display the content, the content may be mapped to the virtual quadrangle region except for a specified or arbitrary margin region. For example, a certain image may be mapped to the virtual quadrangle region except for a margin of 300 pixels from an edge. In other words, the image may be mapped to a quadrangle region 600 pixels larger than that of the virtual quadrangle region in width and height.

The first display device 100 (master display) may output a content (e.g., an image) to each display as if the content moves in a specific direction. For example, the content may be output to each display as if the content moves downward. When the content moves downward, the moving effect of the content is continued until a point (e.g., the top end of the contents) of the content having an upper margin of "0" is output. When the point having the upper margin of "0" is output, the moving effect is applied in a reverse direction or a random direction.

Figure 6B:
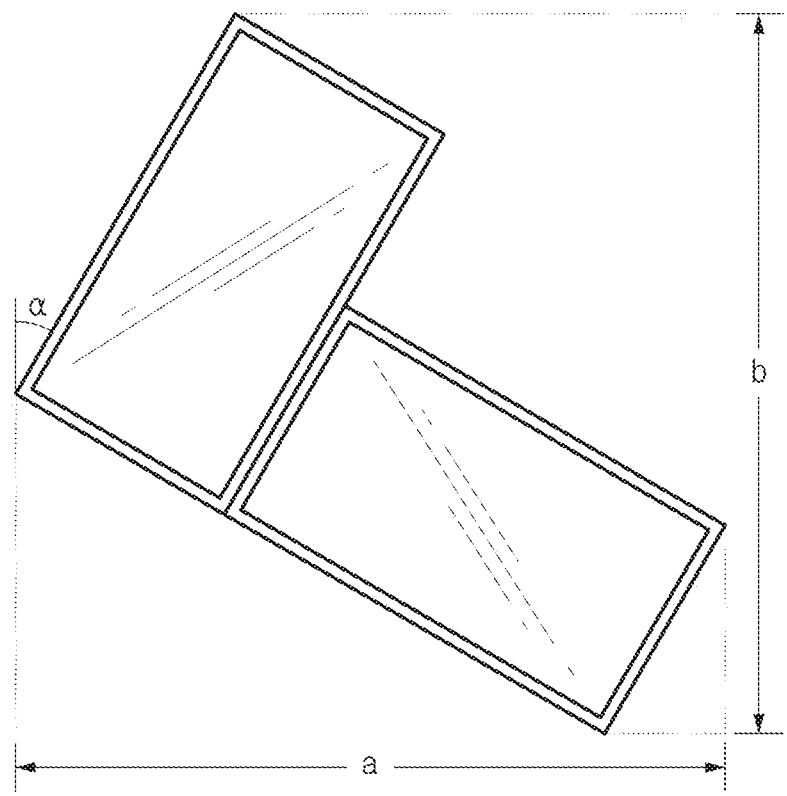
FIG. 6B illustrates a method of determining a region for outputting content, according to another embodiment.

FIG. 6B illustrates a method of determining a region for outputting a content, according to another embodiment.

FIG. 6B may correspond to an embodiment of determining angles of display devices inclined about a vertical direction (the direction of gravity) as the display devices are fixed to the surface of a wall. Differently, the previous embodiment illustrated in FIG. 6A may correspond to an example that the inclination is not considered or the consideration of the inclination is impossible since the display device is arranged on a plane. Hereinafter, the assumption in FIG. 6A may be identically applied to FIG. 6B.

Referring back to FIG. 6B, the first display device 100 may map a content, which is to be output, to a virtual quadrangle region circumscribed about a full display region constructed based on the arrangement of the displays. Although the width and the height of the circumscribed virtual quadrangle region are determined by the widths and the heights of the display devices in FIG. 6A, the circumscribed virtual quadrangle region may correspond to a quadrangle region having the maximum length in a vertical/horizontal direction of the fully display region constructed based on the arrangement of the displays in FIG. 6B. When the length between the uppermost coordinates end and the lowermost coordinates is "b" and the length between the rightmost coordinates and the leftmost coordinates is "a", a virtual quadrangle having the height of "b" and the width of "a" may correspond to a quadrangle circumscribed about the full display region in FIG. 6B.

The first display device 100 may determine a region of a content, which is mapped to a region, which corresponds to each display device, of the virtual quadrangle region as a region to be output to each display. In other words, even in the embodiment of FIG. 6B, since the virtual quadrangle region is formed based on the vertical direction such that the virtual quadrangle region is not inclined, the content output to the display region is not inclined.

In an embodiment illustrated in FIG. 6A or 6B, the control circuit 110 of the first display device 100 may map the virtual quadrangle region to the content in various manners.

For example, the control circuit 110 may map the center of the virtual quadrangle region to the center of the content and may map the virtual quadrangle region to the content such that the width or the height of the content corresponds to the width or the height of the virtual quadrangle based on the mapped center. For example, when the virtual quadrangle region is in 100×100 and when the content has the resolution of 50×200, a width (50) of the content may be mapped to correspond to the width (100) of the virtual quadrangle region. In this case, the height of the content may be extended to 400. Since the center of the content is mapped to the center of the virtual quadrangle region, even if the full display region is matched with the virtual quadrangle region, 150 px of each of the left side and the right side of the content may not be displayed on the display region. In this case, the above-described moving effect is applied and thus the content may fully be viewed on the display region with the lapse of time.

In the above example, when the height (200) of the content is mapped to the height (100) of the virtual quadrangle region, the content is not present at the large part of the display region. For example, even if the virtual quadrangle region is matched with the display region, the content is output only to a 25×100 region, which is provided around the center in the virtual quadrangle region, and anything is not output to a 75×100 region. However, the control circuit 110 may perform mapping by using a properly intended parameter, which is selected from the width and the height, according to settings.

In addition, the control circuit 110 may map one end of the virtual quadrangle region to one end of the content. For example, the uppermost end of the virtual quadrangle region may be mapped to the uppermost end of the content or the left side of the virtual quadrangle region may be mapped to the left side of the content. In addition, the control circuit 110 may perform mapping by resizing the size of the content to be equal to the size of the virtual quadrangle region. In this case, the ratio of width to height of the content may be changed to the ratio of width to height of the virtual quadrangle region.

Although the most of the embodiments has been described in that two displays are coupled to (connected with) each other for the convenience of explanation, the above-described method and principle may be applied even to the case that at least three displays are coupled to each other.

For example, when a first external display device is directly coupled to (connected with) the display device 100 and a second external display device is indirectly connected with the display device 100 through the first external display device, the control circuit 110 may determine a first region of a content to be output to the display device 100, a second region of the content to be output to the first external display device, and a third region of the content to be output to the second external display device, based on the arrangement of the display device 100, the first external display device, and the second external display device. In addition, the control circuit 110 may output the first region to the display panel, may transmit data on the second region to the first external display device through a contact point, and may transmit, to the first external display device, data on the third region and a command for transferring the data to the second external display device. In addition, according to another embodiment, the display device 100 may transmit the data on the second region and the data on the third region to the first external display device and the second external display device, respectively, through wireless communication.

Hereinafter, various embodiments, which are utilized through the above-described combination of the displays, will be described.

Figure 7:
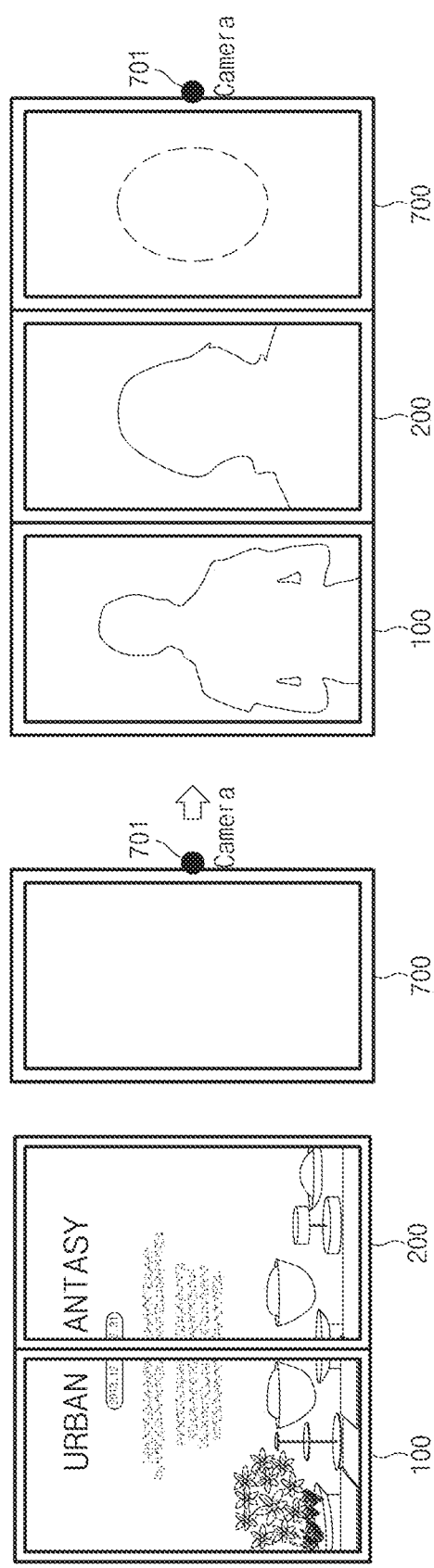
FIG. 7 illustrates the coupling of a display having a camera function, according to an embodiment.

FIG. 7 illustrates the coupling of a display having a camera function, according to an embodiment.

Referring to FIG. 7, in the state that the first display device 100 is directly connected with the second display device 200, an external display device 700 having a camera function is directly connected with the second display device 200. In FIG. 7 and the description of following embodiments, it is assumed all display devices include at least one of the above-described contact points.

The external display device 700 may include a camera module 701. In addition, differently from the structure illustrated in FIG. 7, the same description may be applied even to the case that a master display (e.g., the first display device 100) is directly connected with the external display device 700.

The first display device 100 may obtain information associated with functions provided in display devices directly or indirectly connected with the first display device 100. As illustrated in FIG. 7, when recognizing the connection of the display device having the camera function is connected, the first display device 100 may transmit, to the external display device 700, a command for activating the camera function and transmitting an image, which is obtained, to the first display device 100.

When the image is obtained from the external display device 700, the first display device 100 may output the obtained image by taking into consideration the arrangement of the display devices directly or indirectly connected with the first display device 100. In this case, a display device having a specific function may be excluded when taking into consideration the arrangement and may output a specified image or continuously perform a specified function. In other words, a camera preview image may be continuously output to the external display device 700.

Figure 8:
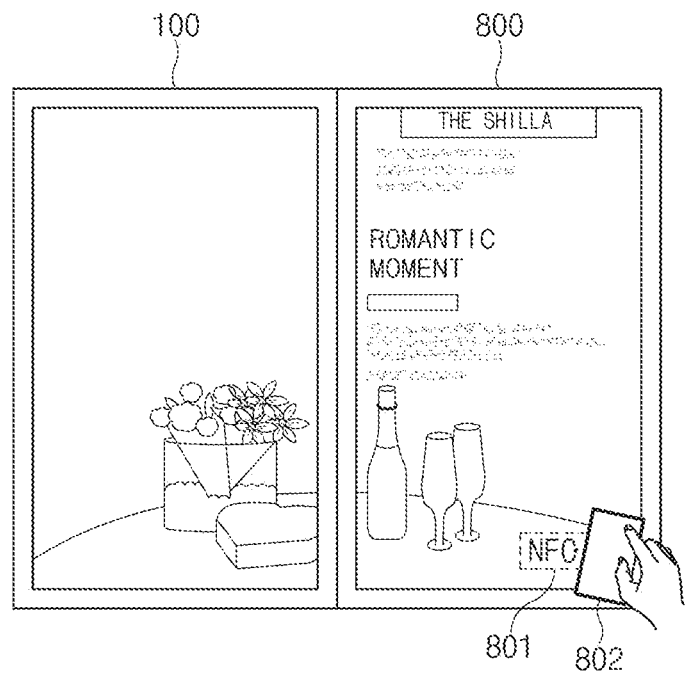
FIG. 8 illustrates the coupling of a display having an NFC function, according to an embodiment.

FIG. 8 illustrates the coupling of a display having an NFC function, according to an embodiment.

Referring to FIG. 8, an external display device 800 coupled to the first display device 100 may support an NFC function. When the external display device 800 supports the NFC function, the first display device 100 may allow an indication 801, which represents that the NFC function is supported, to the external display device 800. If the external display device 800 does not support NFC, but the first display device 100 supports NFC, the indication 801 may be displayed on the first display device 100, for example, on a position allowing NFC tagging.

When NFC tagging occurs, the first display device 100 may perform a function, such as payment, registration, or check-in, based on NFC tagging or may perform a function such as providing detailed information on a content, which is currently output, to a user terminal 802 (e.g., smartphone) which has performed the tagging.

Figure 9:
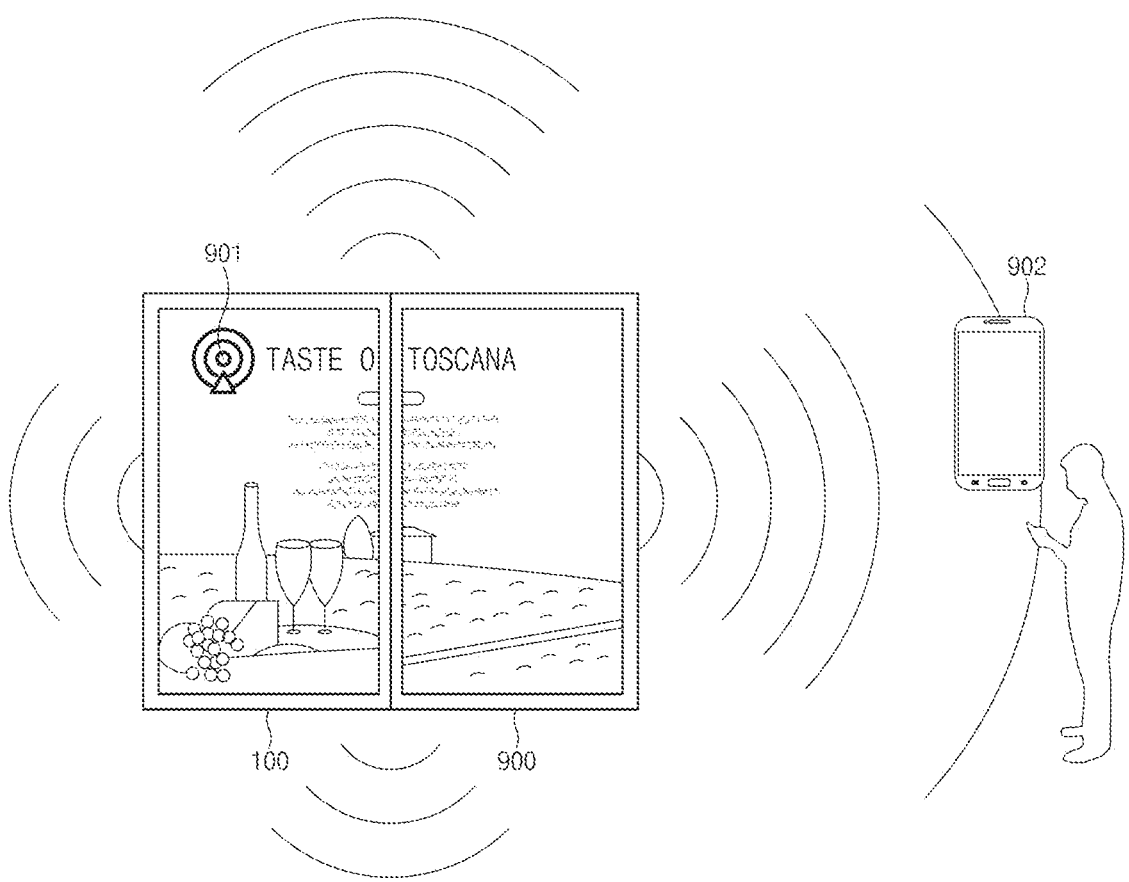
FIG. 9 illustrates the coupling of a display having a beacon function, according to an embodiment.

FIG. 9 illustrates the coupling of a display having a beacon function, according to an embodiment.

Referring to FIG. 9, an external display device 900 coupled to the first display device 100 may support a beacon function. The first display device 100 may allow the external display device 900 to output an indication 901 representing the presence of the beacon function or the presence of a broadcast message based on a beacon, when the external display device 900 supports the beacon function. Differently from NFC, the type of a display device supporting the beacon function may not be important to a user. In this case, the indication 901 may be output onto the first display device 100.

For example, when a user positions around a display structure while holding a terminal 902 for utilizing the beacon function, the terminal 902 of the user may receive information, such as a coupon or information on a promotion, from the first display device 100. In more detail, the first display device 100 may provide, to the external display device 900, a message or data to be broadcasted together with information on a content region to be output through the beacon. The external display device 900 may broadcast the received message or data and the terminal 902 of the user may receive the message or data.

Figure 10:
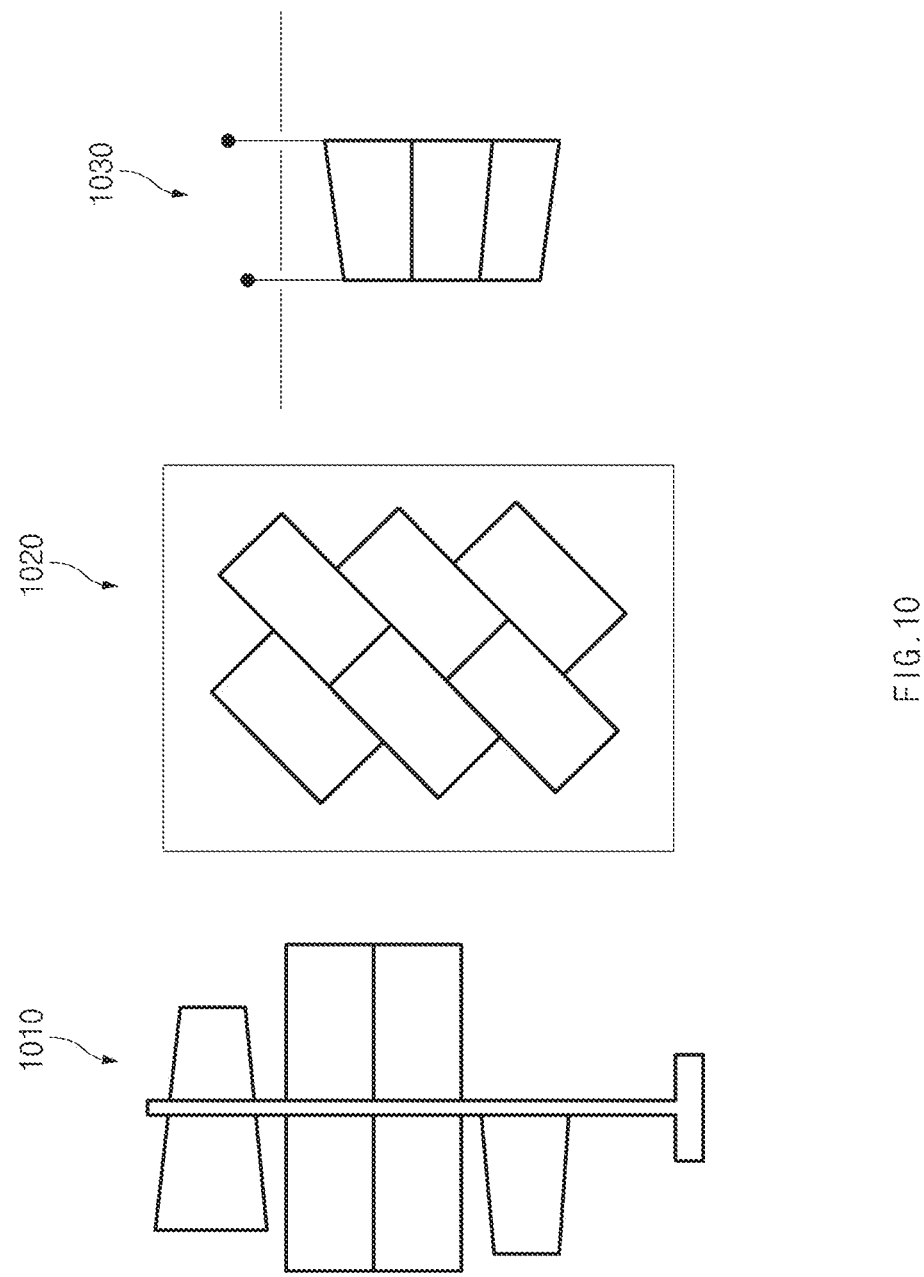
FIG. 10 illustrates a mounting scheme of display devices, according to various embodiments.

FIG. 10 illustrates a mounting manner of display devices, according to various embodiments.

For example, a plurality of display devices may be mounted like a sign 1010. For example, a display device individually coupled to the central frame may output a specified screen, and a display device connected with at least one display device through a contact point may output a content in the above-described scheme. Power may be supplied to the display devices through the central frame.

For another example, a plurality of display devices may be mounted in a form 1020, such as a frame, a mural, or a mirror, on the surface of a wall. In this case, a magnet may be included in the display device such that the display device is bonded to the surface of the wall. This magnet may interact with a magnet, which is previously disposed on the surface of the wall, such that the display device may be fixed to the surface of the wall. In addition, the display devices may be wirelessly charged with power through a wireless charging circuit previously provided on the surface of the wall.

Alternatively, the display devices may be mounted in a hanging type 1030. For example, the display devices are connected with a frame fixed on the ceiling and fixed to the frame. In this case, the frame may have a wire structure for supplying power to the display devices through contact points provided on the respective side surface of a plurality of displays.

Figure 11:
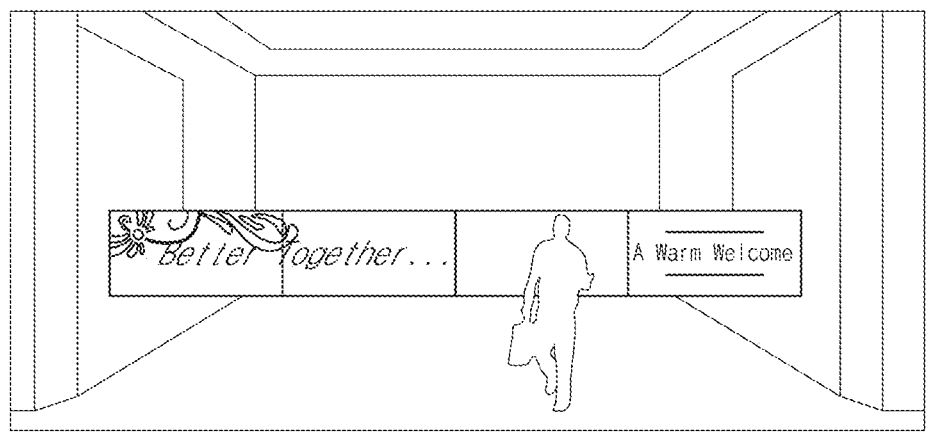
FIG. 11 illustrates a digital signage using the structure of coupled displays, according to an embodiment.

FIG. 11 illustrates a digital signage using the structure of coupled displays, according to an embodiment.

Referring to FIG. 11, a digital signage, which is made by coupling a plurality of displays to each other, may be disposed in a hotel or building lobby. According to a conventional scheme, since a central system determines, in advance, the arrangement of the displays and a content to be output, if any one display is failed or power is shut off, the content may be output in a significant strange or abnormal scheme. In contrast, according to an embodiment of the present invention, even if the coupling structure with any one display is failed (e.g., mechanically decoupling or electrically disconnected due to power failure or machine failure, the master display may determine displays connected with each other and may determine a content to be output again.

Figure 12:
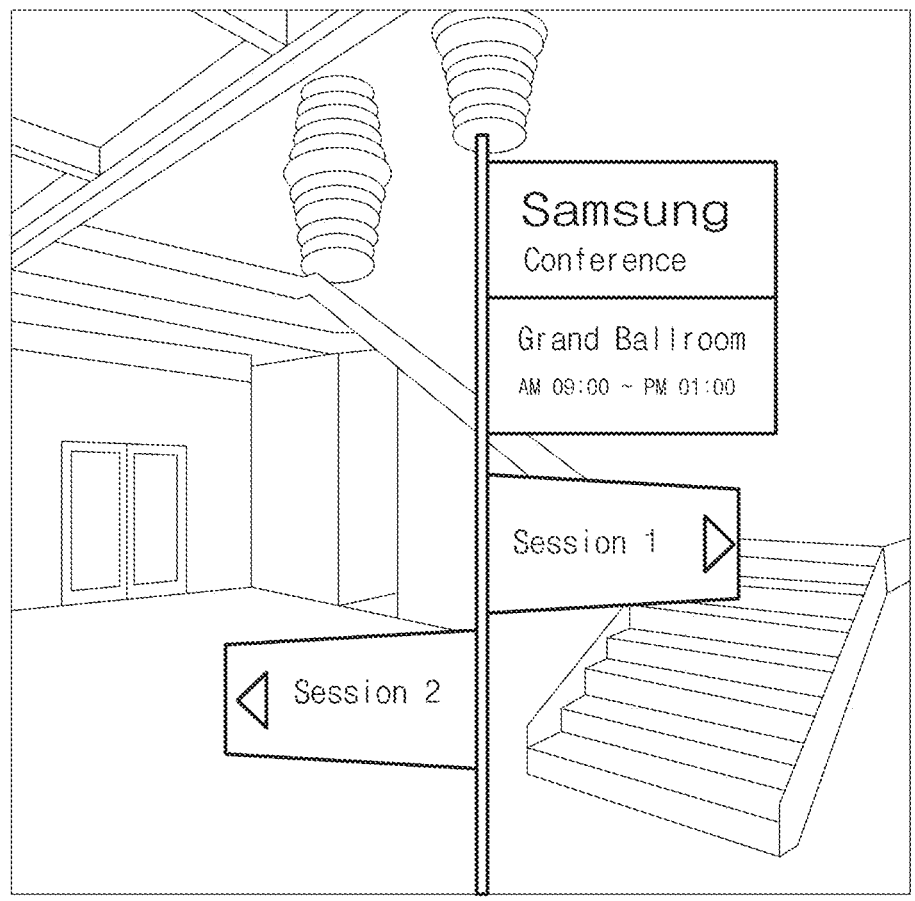
FIG. 12 illustrates a digital signage using the structure of coupled displays, according to another embodiment.

FIG. 12 illustrates a digital signage using the structure of coupled displays, according to another embodiment.

Referring to FIG. 12, a plurality of display devices may be disposed on a sign in a hotel or company lobby. For example, although a simple sign notifying the session position of a specific meeting may be indicated through one display device, a sign for providing more detailed information may be indicated through the coupling between at least two display devices. In this case, when the conventional scheme is employed and when any one of displays outputting "Samsung Conference/ Grand Ballroom AM 09:00~PM 01:00" is abnormally operated, a user cannot know where or when does Samsung Conference take place (in the case that a lower display is erroneously operated), or cannot know what the meeting in Grand Ballroom is about? (in the case that an upper display is erroneously operated). However, according to an embodiment of the present disclosure, when any one display device is erroneously operated, information may be output to one display or may be output based on the arrangement of displays coupled to each other except for the failed display.

The above embodiments are provided for the illustrative purpose, and display devices having various functions may be connected with each other. For example, a first display device supporting a first function, a second display device supporting a second function, and a third display device supporting a third function (or more many display devices) may be connected with each other. In this case, a display device (e.g., the first display device) serving as a master display may activate at least one function among the first function, the second function, and the third function, and may output information based on the arrangement of the displays. For example, when the first function is a TV function (e.g., when the first display device is a TV), the master display may output a TV screen to a full display region based on the arrangement of the first display device, the second display device, and the third display device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A display device comprising:
a memory configured to store a content;
a display panel configured to output at least a portion of the content;
a plurality of contact points disposed on a side surface of the display device;
a control circuit electrically connected with the memory, the display panel, and the plurality of contact points; and
a sensor,
wherein a first contact point of the plurality of contact points is configured to contact with a second contact point disposed on a side surface of an external display device, and
wherein when the first contact point is in contact with the second contact point, the control circuit is configured to:
determine a virtual quadrangle region defined by a maximum length of arrangement of the display device and the external display device along a first axis and along a second axis, the virtual quadrangle region including a first region corresponding to the display device, a second region corresponding to the external display device, and a third region where the content is not output on any device;
map the content to the virtual quadrangle region:
detect an inclination angle of the display device through the sensor:
correct an angle for outputting the content based on the detected inclination angle:
output a first portion of the content mapped to the determined first region of the virtual quadrangle region to the display panel of the display device, at the corrected angle; and
control the external display device to output a second portion of the content mapped to the determined second region of the virtual quadrangle region to the external display device, at the corrected angle.

2. The display device of claim 1, wherein when the first contact point is in contact with the second contact point, at least a portion of the side surface of the display device on which the first contact point is disposed is configured to contact with at least a portion of the side surface of the external display device on which the second contact point is arranged.

3. The display device of claim 1, wherein the control circuit is configured to:
transmit data on the determined second region to the external display device.

4. The display device of claim 1, further comprising:
a communication circuit configured to support at least one wireless communication scheme,
wherein the control circuit is configured to:
allow the communication circuit to transmit the data on the determined second region to the external display device by using the at least one wireless communication scheme.

5. The display device of claim 1, wherein the control circuit is configured to:
transmit a portion of available power of the display device to the external display device.

6. The display device of claim 5, wherein the control circuit is configured to:
transmit the portion of the available power to the external display device, based on whether the display device is connected with an external power source, whether the external display device is connected with an external power source, resolution of the display device, and resolution of the external display device.

7. The display device of claim 5, wherein the control circuit is configured to:
transmit an indication representing power shortage to the external display device, when the portion of the available power is smaller than power required by the external display device.

8. The display device of claim 1, wherein the control circuit is configured to:
transmit data with respect to the second region to the external display device.

9. The display device of claim 1, wherein the control circuit is configured to:
map a center of the virtual quadrangle region to a center of the content.

10. The display device of claim 1, wherein the control circuit is configured to:
map one end of the virtual quadrangle region to one end of the content.

11. The display device of claim 1, wherein the control circuit is configured to:
adjust a size of the content to be equal to a size of the virtual quadrangle region.

12. The display device of claim 1, wherein the control circuit is configured to:
enlarge the content such that one of a width and a height of the content is equal to any one of a width and a height of the virtual quadrangle.

13. The display device of claim 1, wherein the display device is connected with a second external display device through one of the plurality of contact points, and
wherein the control circuit is configured to:
output an image, which is obtained through a camera provided in the second external display device, to the display panel or a first external display.

14. The display device of claim 1, wherein each of the plurality of contact points further includes a proximity sensor, and
wherein the control circuit is configured to:
output the first region to the display panel when the proximity sensor senses that the first contact point makes contact with the second contact point; and
output the content to the display panel when the proximity sensor senses that the first contact point is not in contact with the second contact point or the contact between the first contact point and the second contact point is released.

* * * * *